No. 731,660.

Patented June 23, 1903.

UNITED STATES PATENT OFFICE.

EDWIN BENNETT, OF MILL VILLAGE, PENNSYLVANIA.

PAINT COMPOUND.

SPECIFICATION forming part of Letters Patent No. 731,660, dated June 23, 1903.

Application filed March 30, 1903. Serial No. 150,123. (No specimens.)

*To all whom it may concern:*

Be it known that I, EDWIN BENNETT, a citizen of the United States, residing at Mill Village, in the county of Erie and State of Pennsylvania, having invented certain new and useful Improvements in Paint Compounds; and I do hereby declare that the following is a full, clear, and exact description of the same.

The present invention has for its object to provide an oil-paint that will be free from the oxid of iron or lead or other deleterious ingredients that would tend to cause the paint to crack, corrode, and peel or otherwise render the same objectionable, particularly when exposed to heat or cold or the elements.

It is the purpose of the invention to produce an oil-paint that will be free from the above objections and that will possess the necessary elasticity to prevent it from cracking or peeling and still retain the necessary hardness to impart to it a wearing body and have a fine finish and gloss, such paint being equally applicable to inside work or outside work upon houses or other structures and also upon the roofs thereof.

In compounding my improved paint I first take one pound of gum-damar, one pound of gum-shellac, one pound of gum-tragacanth, one pound of animal-glue, two pounds of beeswax, two pounds of paraffin-wax, and two pounds of rosin. The above ingredients are placed in a suitable receptacle with thirty gallons of suitable oil, preferably linseed-oil, and mixed together and dissolved by heat, which will form a homogeneous mass about the consistency of paste. This being accomplished and after it is in a comparatively cool state, four ounces of muriatic acid and four ounces of phosphorus may be added, the acid cutting the compound or aiding in mixing and the phosphorus adds in giving elasticity to the paint, although either of these ingredients may be dispensed with, as they are not considered as absolutely necessary, as the gums would give the paint sufficient elasticity and render it impervious to moisture or water, the gums also giving the paint gloss and brilliancy as well as elasticity. The animal-glue assists in hardening the paint and imparts to it a wearing body, and the paraffin-wax softens the paint and prevents it hardening too quick, while the beeswax gives endurance and lasting qualities, and the rosin will harden to a degree the paint and give it sufficient gloss for working purposes, so that the paint will flow evenly and present a smooth and glossy appearance. After the several ingredients are mixed with the oil and dissolved by heat and the acid and phosphorus added, as hereinbefore described, a sufficient quantity of powdered shell-rock is added to make fifty gallons of paint at the required consistency for use, and any suitable coloring-matter may be added to give the paint the required color or tint.

The shell-rock, comprising one of the essential features of the paint compound, is peculiarly adapted as a pigment, and to describe it in brief this rock is found in layers of different strata some distance below the surface of the earth, and between the rock and earth is a layer of roshell ocher. Veins of water run out of the rock, which keep it moist and soft and when found is in the consistency of earth, but when exposed to the air it becomes hard, similar to stone, and in its moist state it pulverizes easily and dries quickly. The shell-rock is considered of material importance in the preparation of this paint compound, as it not only takes the place of oxid of iron or lead or other like injurious ingredients usually employed in the manufacture of paint, but the shell-rock will greatly add to the wearing qualities thereof and render the paint absolutely impervious to moisture or the elements and can be used in any climate with equal success, the shell-rock rendering the paint comparatively indestructible, and in this particular it is invaluable as a paint for roofs or for covering a metal surface.

Driers may be added to the paint as required; but this is left optional with the user of the paint, and I wish it to be understood that the proportions named may be variously modified or changed in compounding the paint, and I do not desire to confine the invention to any particular amount of ingredients used.

Having now fully described my invention, what I claim as new, and desire to secure by Letters Patent, is—

A paint compound consisting of gum-damar, gum-shellac, gum-tragacanth, animal-glue, beeswax, paraffin-wax, rosin, pulverized shell-rock, and a suitable oil, substantially in the proportions named.

In testimony whereof I affix my signature in presence of two witnesses.

EDWIN BENNETT.

Witnesses:
F. H. HUBBARD,
GEORGE M. BOND.